(12) United States Patent
Morton et al.

(10) Patent No.: US 11,093,445 B2
(45) Date of Patent: Aug. 17, 2021

(54) INTELLIGENT METHOD TO GENERATE AND SYNC VIRTUAL MACHINE FILE METADATA FOR SEARCH

(71) Applicant: EMC IP Holding Company LLC, Hopkinton, MA (US)

(72) Inventors: James Morton, Adamstown, MD (US); Min Liu, Shanghai (CN); Lihui Su, Shanghai (CN); Yubing Zhang, Shanghai (CN); Yujun Liang, Shanghai (CN); Ming Zhang, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 259 days.

(21) Appl. No.: 16/250,936

(22) Filed: Jan. 17, 2019

(65) Prior Publication Data

US 2020/0233838 A1      Jul. 23, 2020

(51) Int. Cl.

| | |
|---|---|
| *G06F 7/00* | (2006.01) |
| *G06F 16/14* | (2019.01) |
| *G06F 11/14* | (2006.01) |
| *G06F 9/455* | (2018.01) |
| *G06F 16/901* | (2019.01) |
| *G06F 16/13* | (2019.01) |

(52) U.S. Cl.
CPC .......... *G06F 16/14* (2019.01); *G06F 9/45558* (2013.01); *G06F 11/1448* (2013.01); *G06F 16/13* (2019.01); *G06F 16/9017* (2019.01); *G06F 2009/45562* (2013.01)

(58) Field of Classification Search
CPC ...... G06F 16/14; G06F 16/9017; G06F 16/13; G06F 9/45558; G06F 2009/45562; G06F 11/1448; G06F 11/1458; G06F 11/1484; G06F 11/1451; G06F 11/1469
See application file for complete search history.

(56) References Cited

U.S. PATENT DOCUMENTS

| | | | | |
|---|---|---|---|---|
| 8,577,845 | B2* | 11/2013 | Nguyen | G06F 11/1451 707/654 |
| 8,719,286 | B1* | 5/2014 | Xing | G06F 11/1451 707/755 |
| 9,128,742 | B1* | 9/2015 | Akolkar | G06F 9/45558 |
| 9,235,477 | B1* | 1/2016 | Yueh | G06F 11/1458 |
| 9,477,693 | B1* | 10/2016 | Bachu | G06F 11/1438 |
| 9,569,446 | B1* | 2/2017 | Feathergill | G06F 16/188 |
| 9,628,561 | B1* | 4/2017 | Kulkarni | G06F 11/1464 |
| 9,710,475 | B1* | 7/2017 | Sudarsanam | G06F 16/128 |
| 9,858,154 | B1* | 1/2018 | Lyadvinsky | G06F 3/0673 |
| 2013/0262801 | A1* | 10/2013 | Sancheti | G06F 3/0619 711/162 |
| 2014/0006355 | A1* | 1/2014 | Kirihata | G06F 16/188 707/654 |

(Continued)

*Primary Examiner* — Mohammed R Uddin
(74) *Attorney, Agent, or Firm* — Womble Bond Dickinson (US) LLP (57) ABSTRACT

File metadata of a virtual machine can be generated when performing a backup of a virtual machine. A backup copy of the virtual machine and the file metadata can be stored in a backup storage system. The file metadata can be retrieved from the storage system in a manner that is decoupled from the performance of the backup of the virtual machine. The file metadata can be used for searching for files within the backup copy of the virtual machine.

19 Claims, 6 Drawing Sheets

(56) References Cited

U.S. PATENT DOCUMENTS

| | | | |
|---|---|---|---|
| 2015/0074060 A1* | 3/2015 | Varadharajan | G06F 3/04842 |
| | | | 707/649 |
| 2017/0262204 A1* | 9/2017 | Dornemann | G06F 11/1484 |
| 2018/0113632 A1* | 4/2018 | Sancheti | G06F 9/45533 |
| 2019/0028403 A1* | 1/2019 | Moldvai | H04L 67/1097 |

* cited by examiner

INTELLIGENT METHOD TO GENERATE AND SYNC VIRTUAL MACHINE FILE METADATA FOR SEARCH

FIELD OF THE INVENTION

Embodiments of the present invention relate generally to data storage systems. More particularly, embodiments of the invention relate to generating and syncing VM file metadata for search in one or more backups of a virtual machine (VM).

BACKGROUND

Organizations are increasingly deploying applications on virtual machines (VMs) to improve Information Technology (IT) efficiency and application availability. A key benefit of adopting virtual machines is that they can be hosted on a smaller number of physical servers (VM servers). Different types of VM backup and recovery options exist.

Backup solutions exist in VM environments. An environment can include a host server that has one or more VMs and a VM manager or hypervisor to create and manage VMs. Management tasks include creating backups of VMs. A hypervisor (or VMM) is computer software, firmware and/or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems.

Backups can be performed to provide data protection for information stored on virtual machines. When a backup is performed, a backup copy of a VM is stored onto storage, managed by a backup management server. The backup management server can be configured to backup VMs periodically, or on a per-request basis. The backup server can communicate with the host directly to manage the backups of the VMs. A VM environment can include a centralized management server (CMS) that can serve as an access and management point for multiple VM hosts. In such an environment, a backup server can communicate with the CMS to coordinate and manage a backup of a target VM.

In some cases, a user may wish to search among VM backups for individual files to be viewed or restored.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

As discussed above, a user may wish to search among VM backups for one or more files to be viewed or restored. Searching VM backups, however, can be troublesome. In one case, a list of all the files should be generated in order to perform the search. Otherwise, a searching scheme would involve scanning each backup on a per-search request basis, which would be unrealistically burdensome due to the size of a backup. Thus, it is desirable to generate an index of the files in the backup VM to be used for searching the backup.

One known solution is to deploy an agent (for example, a software module) in each VM that collects the file system's changes and sends back each change to an indexing server. In such a case, file metadata for searching is generated by the agent being deployed on the virtual machine to communicate file data (e.g., every time a file is added, moved, modified or deleted). A drawback here is that scheduling communications between each VM and the indexing server can be laborious and inefficient. Such communications can grow large in number based on the number of changes in happening in each VM and the number of VMs in a host. Furthermore, each VM would have an 'agent' deployed and such agents may require maintenance and change in functionality over time, which may require additional management of legacy agents. Furthermore, due to differences between VM image formats, different agents may have to be deployed among different VMs.

Another known solution for indexing backups includes an indexing server that downloads the entire backup of the VM from the backup server and then parses the disks of the VM to generate and index file metadata of the VM. This 'from scratch' method is also laborious and inefficient because the backups can be large in size and the download can take bandwidth and time. Also, backups may occur periodically, which would exacerbate the inefficiency due to multiple downloads and parsing, in order to sync the indexed file metadata with the latest backups. Furthermore, the index does not need to have the actual files downloaded to provide search results, just information about the files (such as names, paths, size, etc.). Thus, this brute force method can waste time and resources unnecessarily.

Thus, based on the drawbacks mentioned, it is desirable to find an alternative solution. In one embodiment, such a solution may be to generate metadata for VMs when the VMs are being backed up to a backup storage system. It is recognized here that scanning the VM disks during the backup to generate file metadata (e.g., file names and file paths) can also be quite burdensome. For one, the backup operation can be time-consuming and processor intense, where a copy of a VM transferred to a storage system. If the VM has many files, then scanning of the VM to generate a list can add a time cost that would not be practical given the amount of VMs that may be present on a host. Therefore, it is recognized here that de-coupling the backup of a VM from the generation of metadata of the files within the VM may be beneficial. In this manner, a quick generation of file metadata can be performed at the time of backup (e.g., by the host). Separately, the quick generated file data can be retrieved and further processed (e.g., by an indexing machine) to be used for searching.

It is also recognized, however, that for the file metadata to be an accurate representation of the files within the VM, the metadata should reflect the files within the VM at the time the backup is generated. Backups of VMs can occur periodically, and, as a result, the file data in the backups can change. Thus, in one embodiment, the file metadata can be retrieved periodically (e.g., from backup storage to an indexing machine), to sync the searchable indexed file metadata on the indexing machine with the files in the backups thereby maintaining the integrity between the indexed file metadata and the accuracy of search results based on the indexed file metadata. This is described in further detail in other sections herein.

As mentioned, VM image files from different types of VM images can have different VM image formats (e.g., VMDK, qcow2, and VHD). This presents challenges as to how to scan different image formats to generate file metadata. To address this issue, a method to address the differences between VMs during the generation of their respective file metadata is described. In one embodiment, a file table of the VM is scanned and file metadata is populated based on the file table. In this manner, VM file details can be abstracted with high efficiency, without mounting the disk and multiple image formats are supported. In one embodiment, the file metadata can be persisted in a database (e.g., SQLite database). This can beneficially provide quick and fast generation of file metadata in a small, compact file, thanks to optimization. The database file can be stored on a backup storage server regardless of whether indexing and search features are deployed.

According to one embodiment, a method for indexing backup storage of virtual machines for searching, includes: generating file metadata of the virtual machine when performing a backup of a virtual machine; storing a backup copy of the virtual machine and the file metadata of the virtual machine on a storage system; and retrieving the file metadata from the storage system, wherein the retrieving is decoupled from the performance of the backup of the virtual machine, the file metadata to be used for searching for files within the backup of the virtual machine. An indexing server can pull the database files from the backup server, e.g., at a regular cadence. In this manner, the VM file indexes are updated on the indexing server with a known schedule. Furthermore, the indexing is performed independently of the VMs being scanned.

According to one embodiment, generating the file metadata of the virtual machine includes extracting the file metadata from a file table of the virtual machine, the file table containing a filename and an indication of a file path of each file in the virtual machine (e.g., a parent node identifier and a self-node identifier). The full path is not generated in the file metadata at this point, but can be reconstructed, independently, at a different time (e.g., by an indexing server). In this manner, the generation and transport of the file metadata (e.g., a database file) is quick.

According to some embodiments, a system can include: a host processing system that hosts one or more virtual machines having at least one hardware processor, the host processing system coupled to a memory programmed with executable instructions that, when executed by the host processing system, perform operations comprising: generating file metadata of the virtual machine when performing a backup of a virtual machine; storing a backup copy of the virtual machine and the file metadata of the virtual machine on a storage system; or an indexing processing system having at least one hardware processor, the indexing processing system coupled to a memory programmed with executable instructions that, when executed by the indexing processing system, perform operations comprising: retrieving the file metadata from the storage system, wherein the retrieving is decoupled from the performance of the backup of the virtual machine, and the backup of the virtual machine is one of a plurality of backups for a plurality of virtual machines and each backup has a corresponding file database generated for it; formatting the retrieved file metadata; and indexing the formatted file metadata within an indexed file metadata database also containing formatted file metadata from the plurality of backups, to be used for providing search results to a user based on a user query.

Overview

Figure 1:
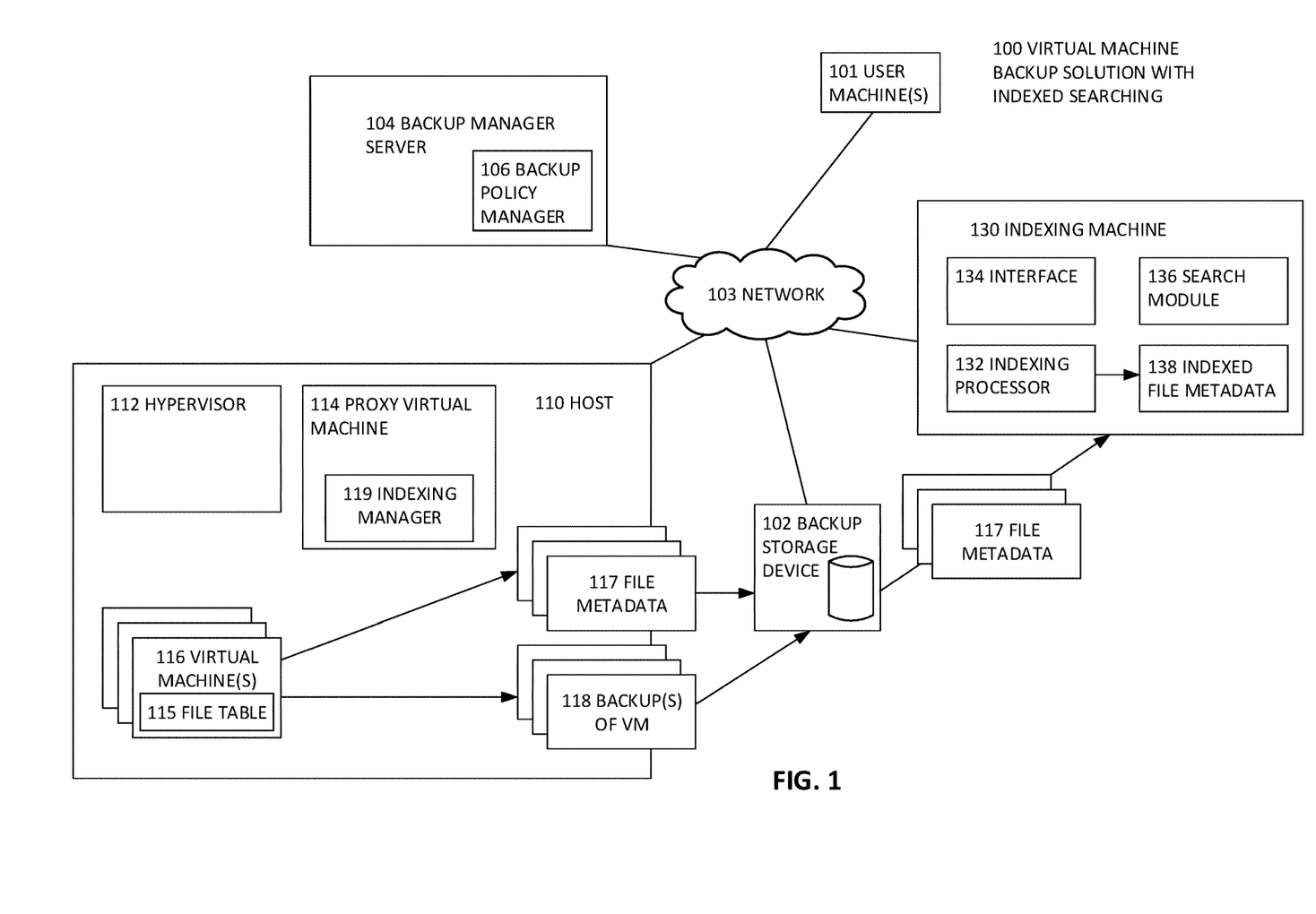
FIG. 1 shows a block diagram illustrating a virtual machine backup solution with indexed searching according to one embodiment.

Referring now to FIG. 1, a VM backup solution with indexed searching 100 is shown according to one embodiment. A host 110 can have a hypervisor 112 that creates, runs and manages the operation of virtual machines 116. A backup manager server 104 can manage backups of VMs on the host by interacting, scheduling and communicating backup commands or requests to the host. A user machine 101 can generate a schedule for the backup of different VMs at different times by configuring a backup policy manager 106, to store the user preferences.

Note that although user machine 101 is shown as a single machine, it can represent one or more user machines that are connected to the network 103. For example, the user machine can be used by an administrator to schedule backups (e.g., by communicating with the backup manager server) or by a different user to search files within the backup (e.g., by sending search parameters to an indexing server).

The host 110 can have a proxy virtual machine 114 that performs backup related tasks such as generating a backup 118 of a VM (e.g., a copy of the VM's disks and operating system) and copying the backup to a backup storage device 102. The backup storage device 102 can have one or more memory devices (e.g., hard drives and/or flash memory) that store the VM backups.

The proxy virtual machine 114 can have an indexing manager 119. During a backup of a VM, the proxy can also generate file metadata 117. The backup and the file metadata can be stored onto a backup storage system. It should be understood that 'during' can mean that the generating of the file metadata is triggered by the backup of the VM, and that it can happen concurrent with, prior to, or after the backup of the VM, in a manner that the file metadata accurately represents the files that are stored in the VM. In one embodiment, the indexing manager scans a file table 115 of the VM to extract file metadata 117 during backup. Through this process, generating the file metadata is performed by the host (or by a proxy virtual machine within the host) that manages and stores the virtual machine, without an agent being deployed on the virtual machine to communicate file data to an indexing machine for searching. This also obviates the need by the indexing machine to download the backup copy from the backup server to scan the backup copy directly.

In one embodiment, the backup of the virtual machine is one of a plurality of backups 118 for a plurality of virtual machines 116 and each backup has corresponding file metadata 117 generated for it. Each file metadata can be in the form of a database file having a known format (e.g., SQL, SQLite, and CSV).

The file table 115 can contain file names, file paths, file sizes, file modification and creation times, and other file data. The file table is generally present in VMs, even across VMs having different OS types and is actively managed by the OS of each VM. In this manner, the system and process can leverage the VM's already-existing and updated file table to generate the file metadata 117 to be indexed and used for search, rather than scanning the VM disk(s) to index the files.

An indexing machine 130 can, in a manner that is decoupled from the backup schedule of the VMs, retrieve the file metadata 117 from the backup storage device 102. The indexing machine can have an indexing processor 132 that processes the raw file metadata into an optimized, more searchable format. For example, the file metadata can be formatted for string-based searching by generating intelligible human readable strings for file names and file paths. In one embodiment, the indexing machine 130 can retrieve the file metadata 117 at regular intervals (e.g., once or twice a day), to sync the indexed file metadata 138 with the backup VMs.

The indexing machine can have an interface 134, for example, a graphical user interface, command line user interface, or application programming interface, for a user machine 101 to search files in VM backups. For example, a user machine 101 can enter a search request based on a given file name, a particular VM, a file creation or modification date, a file directory path, or combinations thereof.

A search module 136 can then search through the indexed file metadata with known search algorithms. The indexed file metadata can be optimized for search, for example, based on an ordering of files and naming conventions for file entries. For example, times (e.g., creation time and modification time), file names, and file paths can be converted to intelligible human-readable strings by the indexing processor.

The file metadata 117 can also include VM and backup-based metadata such as a VM identifier, a backup identifier, a VM OS type and version, a backup creation time, a VM backup size, and more. The indexing processor 132 can also organize this data with the indexed file metadata (e.g., relating the VM and backup data with the corresponding VM backup and the corresponding file metadata) to be optimized for search by known indexing techniques.

Thus, the indexing machine can format the retrieved file metadata, the formatting being optimized (e.g., for string-based searching). The formatted file metadata can be entered into an indexed file metadata database, to be used for providing search results to a user based on a user query.

The backup manager 104, the user machine 101, host 110, and indexing machine 130 can connect to and communicate through a network 103. Network 103 may be any type of networks such as a local area network (LAN), a wide area network (WAN) such as the Internet, a fiber network, a storage network, or a combination thereof, wired or wireless.

Although shown separately, in one embodiment, the host, indexing machine, backup manager and storage device can be integral to the same machine (e.g., a computer with processor and memory), or combined in different configurations (e.g., the storage device can be integral to the backup manager, the indexing machine can be integral to the host, or the backup manager server can be integral to the indexing machine). It should be understood that the host, indexing machine, backup manager, and storage device can each be described as a 'server', e.g., a computer or computer program which manages access to a resource or service in a network.

Process

Figure 2:
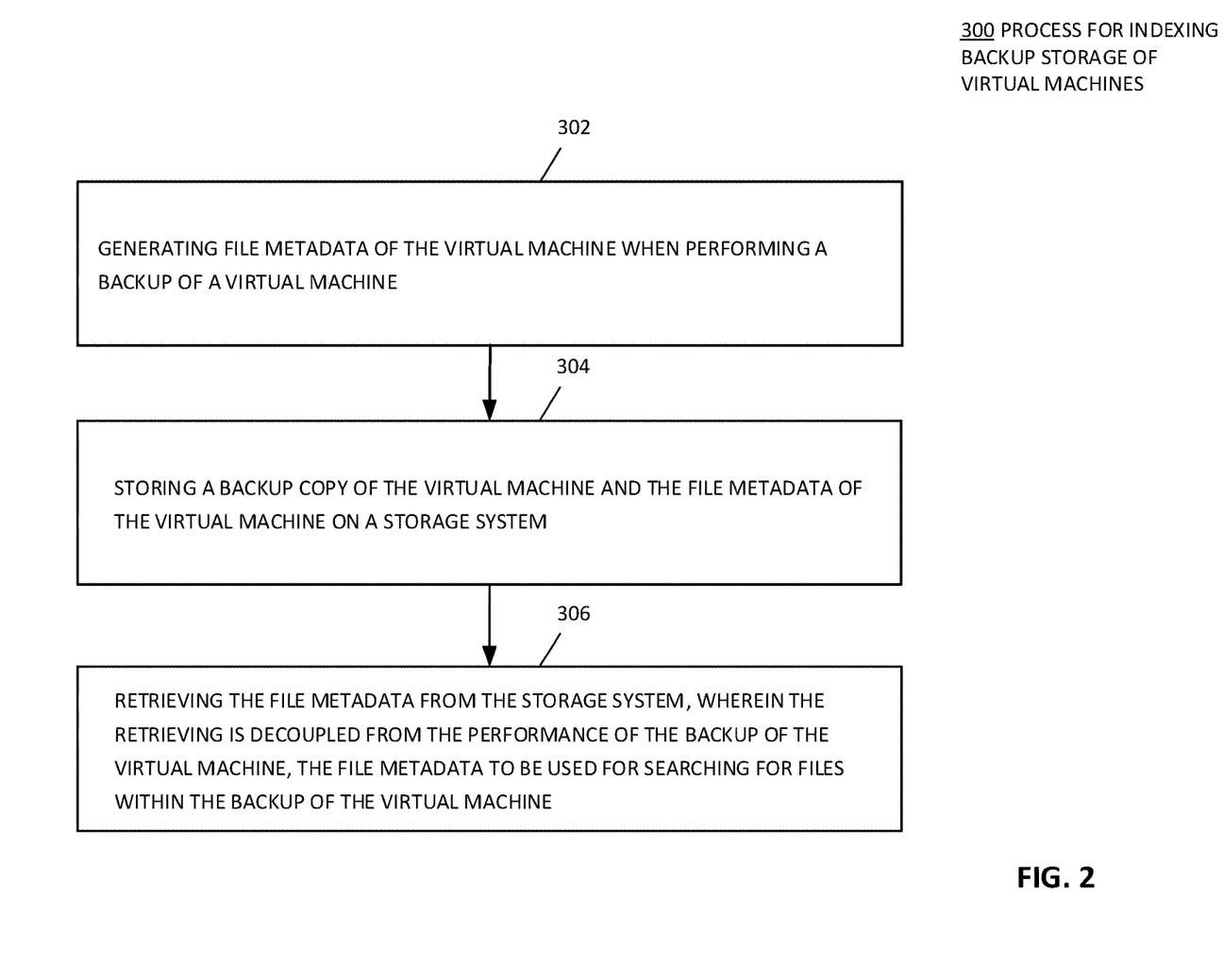
FIG. 2 shows a process for indexing backup storage of virtual machines, according to one embodiment.

Referring now to FIG. 2, a process 300 is shown for indexing backup storage of virtual machines for searching. The process includes block 302, generating file metadata of the virtual machine when performing a backup of a virtual machine. As described, this can include scanning a file table of a VM to extract file metadata. This can be done in a quick manner, for example, without generating full file paths.

In block 304, the process includes storing a backup copy of the virtual machine and the file metadata of the virtual machine on a storage system. The storage system can be a cluster of managed memory such as hard disks, flash memory, or equivalent technologies.

In block 306, the process includes retrieving the file metadata from the storage system, wherein the retrieving is decoupled from the performance of the backup of the virtual machine, the file metadata to be used for searching for files within the backup of the virtual machine. The file metadata can be formatted and indexed into indexed file metadata. In one embodiment, if the file metadata is an SQL or SQLite database, the process can use SQL query to generate full file paths for each entry in the file metadata. The terms 'entry' and 'record' shall be used interchangeably in reference to the file metadata.

Example Sequence

Figure 3:
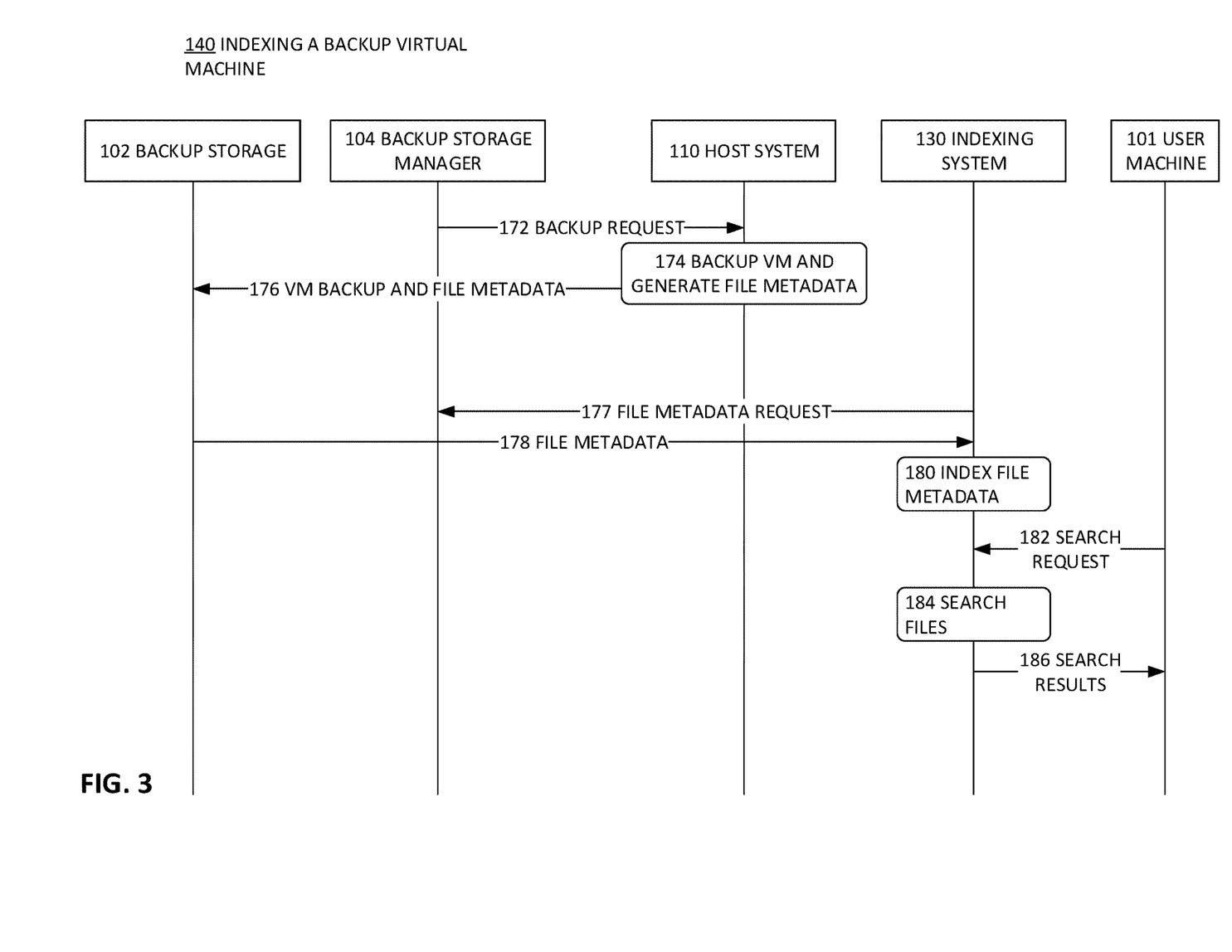
FIG. 3 shows a sequence diagram illustrating a process to index and search a backup virtual machine according to one embodiment.

Referring now to FIG. 3, a sequence diagram is shown according to one embodiment that provides an example of generating file metadata, indexing the file metadata, and syncing the indexed file metadata. A process 140 of indexing a backup virtual machine can include the following features.

A backup storage manager 104 can send a backup request 172 to a host 110. The host can, at block 174, can back up the VM (e.g. by making a copy of the VM OS and disk(s)) and generate file metadata (e.g., by scanning the file table of the VM). File metadata can include a file name, an indication of file path, file size, creation time, modification time, combinations thereof, and other file related data of interest. File metadata can also include backup data, for example, a VM name, a disk name, a backup identifier, a backup time, an OS type, and more.

At block 176, the VM backup and file metadata can be copied to memory storage on the backup storage unit through known transfer protocols and/or disk mounting procedures. The file metadata can persist in backup storage as a database file (e.g., SQL, SQLite, CSV, or other format)

The indexing system can send 177 a file metadata request to the back storage manager 104 or directly which can, in turn, cause the backup storage 102 to send 178 the file metadata to the indexing system. Although shown as such, in another embodiment, the indexing system can also access the file metadata directly from the backup storage device 102 without going through the backup storage manager 104.

The indexing system can, at block 180, index the file metadata by reading and parsing the file metadata, and then entering the file metadata into an indexed file metadata. As mentioned, the self-node identifier and parent node identifier can be generated for each file entry, based on scanning the disk of the VM or the file table, without generating a full path in file metadata, thereby reducing the processing cost of the operation and the size of the file metadata. The indexing system can reconstruct or generate full file paths (or 'absolute' file paths) based on the parent node id and the self-node id associated with the file or sub-directory in the retrieved file metadata, as previously discussed. The full file paths can then be entered into the indexed file metadata. The indexing system can also optimize the organization of the file records to be searched by search algorithms with known indexing techniques.

A user machine 101 can generate a search request 182, with search parameters (e.g., file name, creation date, etc.). These search parameters can be used by the indexing system 130 to search 184 the indexed file metadata (e.g., by using the parameters as search filters). The search results 186 can then be provided to the user machine, for example, through a user interface.

It should be understood that, in one embodiment, the retrieval of file metadata (sequences 177 and/or 178 in FIG. 3) is de-coupled from the backup process, so that the retrieving of the file metadata does not depend on VM backups. The file metadata can be retrieved at a regular period. For example, the retrievals can be scheduled at to run once or twice per day. When the data is retrieved, the new file metadata can by entered into the existing indexed file metadata, to sync the indexed file metadata on the indexing machine with the VM backups.

File Metadata Schema

Figure 4:
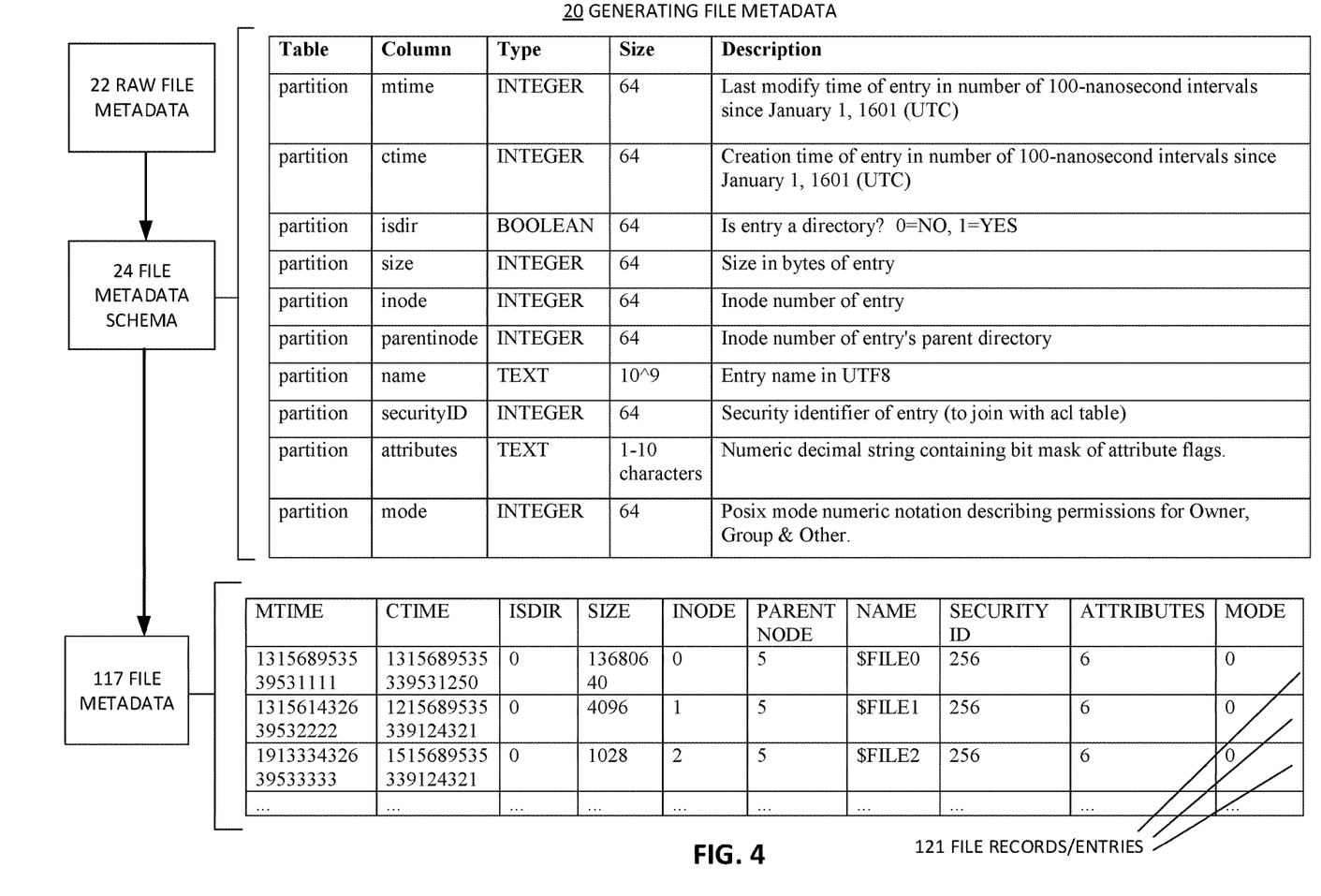
FIG. 4 shows a flow diagram of generating file metadata, according to one embodiment.

With regard to generating the file metadata (e.g., by the host during backup), FIG. 4 illustrates such a process using a file metadata schema. For example, the host or a proxy VM within a host can access raw file data 22 of the target VM that is being backed up. As discussed, in one embodiment, this raw file data can be a file table generated by a VM. In another embodiment, the host or proxy VM can scan the disk(s) of the VM to generate the file metadata. The raw file metadata is read and formatted into file metadata 117 based on rules and format definitions present in the file metadata schema.

For example, the file metadata schema can define columns of a database such as 'mtime', 'ctime', 'size', 'isdir', 'inode', and 'parentinode'. Based on the schema, the file metadata 117 can be formatted in the form of a database file (e.g., SQL, SQLite, CSV, etc.) having a known and/or standard format. The file metadata 117 can have multiple file records 121, each file record corresponding to a file or directory. In the case that the file record is a directory, the record can have an 'isdir' flag set to true, which indicates that the record or entry is a directory.

In one embodiment, the file metadata is generated in the form of a file database, the file database containing a record/entry for each file (and/or subdirectory) in the backup of the virtual machine. In one embodiment, each record of the file database has a fixed size (or substantially fixed, e.g., within 75%, 95% or 99% of a fixed size), such that a size of the file database can be estimated based on a number of records in the file database. This can aid in predicting the performance and threshold of sizes of the file metadata.

For example, referring now to table 1, a file metadata for a target VM containing 250K items (files and/or folders) was generated in 10 seconds. In this test, the file metadata was generated in the form of a SQLite database file, although other formats could have been employed. This generation time does not put an undue burden on the backup server. The metadata generation did not use substantial CPU resources (3.8%) nor does the CPU usage increase as the count of files and folders increase. A tradeoff, however, is that memory usage can increase as the number of items (files and/or folders) increases in a target VM. Beneficially, the average entry size is roughly 100 bytes, which can be used to estimate the size of the file metadata (e.g., the database file that the file metadata is persisted in).

TABLE 1

|  | File/Folder Count | SQLite File Size (Byte) | Average Item Size (Byte) | Time | CPU Usage | Memory Usage |
| --- | --- | --- | --- | --- | --- | --- |
| Test 1 | 250,000 | 29,000,000 | 116 | 10 sec | 3.80% | 7.04% |
| Test 2 | 1,000,000 | 97,000,000 | 97 | 51 sec | 2.32% | 10.18% |
| Test 3 | 10,000,000 | 1,000,000,000 | 100 | 12 min 3 sec | 1.21% | 17.10% |

File Path

Figure 5:
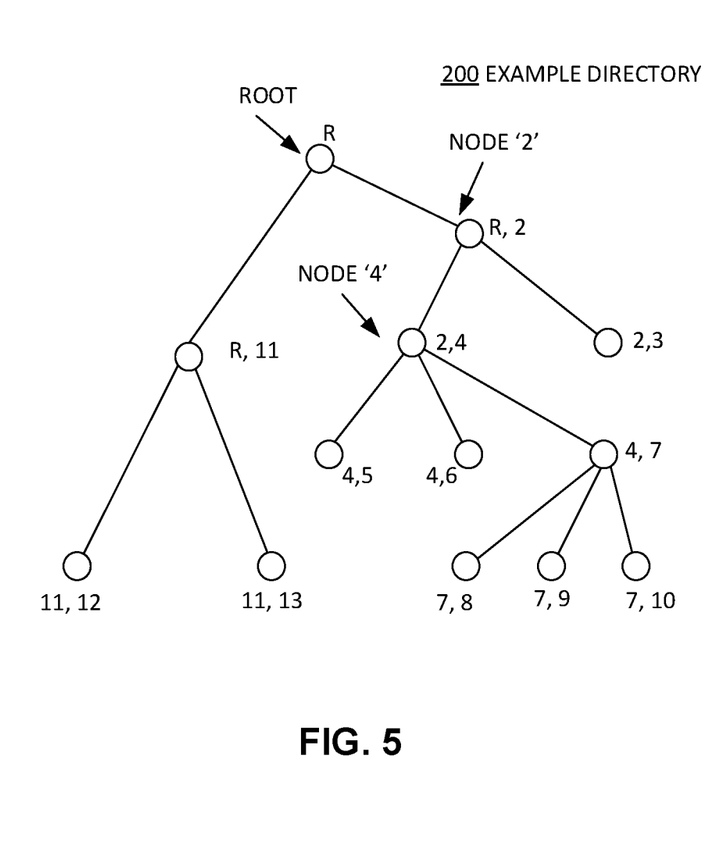
FIG. 5 shows an illustration of an example directory of a virtual machine.

Regarding file path and referring now to FIG. 5, a directory 200 is shown as a tree of nodes branching from a root 'R'. A system for describing the position of each node can use absolute or full path names, or relative path names. In the latter case, each node can be associated with metadata that identifies the current node identifier and also the parent node identifier. For example, 'node 2' can have a relative path name 'R, 2' because it has, as a parent 'Root' and a current or self-node identifier of 2. Thus, the relative path metadata for 'node 2' can be 'R, 2'. Similarly, 'node 4' here can have relative path metadata of '2, 4', because the parent node is '2' and the self-node ID is '4'. Note that nodes 2 and 4 can be sub-directories as indicated in this example because they have child nodes (e.g., files that branch from them).

In one embodiment, as described herein, the method or system generates the file metadata by generating a record for each file and/or directory, where each record has a current node id and a parent node id. The current node id is the identifier for the current node (file or sub-directory). The parent node is the identifier for the parent node. The file metadata can then be processed (e.g., by an indexing machine) to generate an absolute file path, based on the current node id and the parent node id.

In other words, the directory tree can be reconstructed or rebuilt based on the current node id and parent node id. Beneficially, this means allows for more efficient processing during the initial file metadata generation during backup. The indexing process, which can be de-coupled from the backup process, can then perform a more rigorous exercise of generating full path names for each file in the corresponding file record. This full path name can be used for searching or provided to a user based on a user query.

It should be understood that although FIG. 5 merely illustrates an example of a directory/node structure and the nomenclature shown does not necessarily represent the nomenclature used by the processes or systems described herein.

Figure 6:
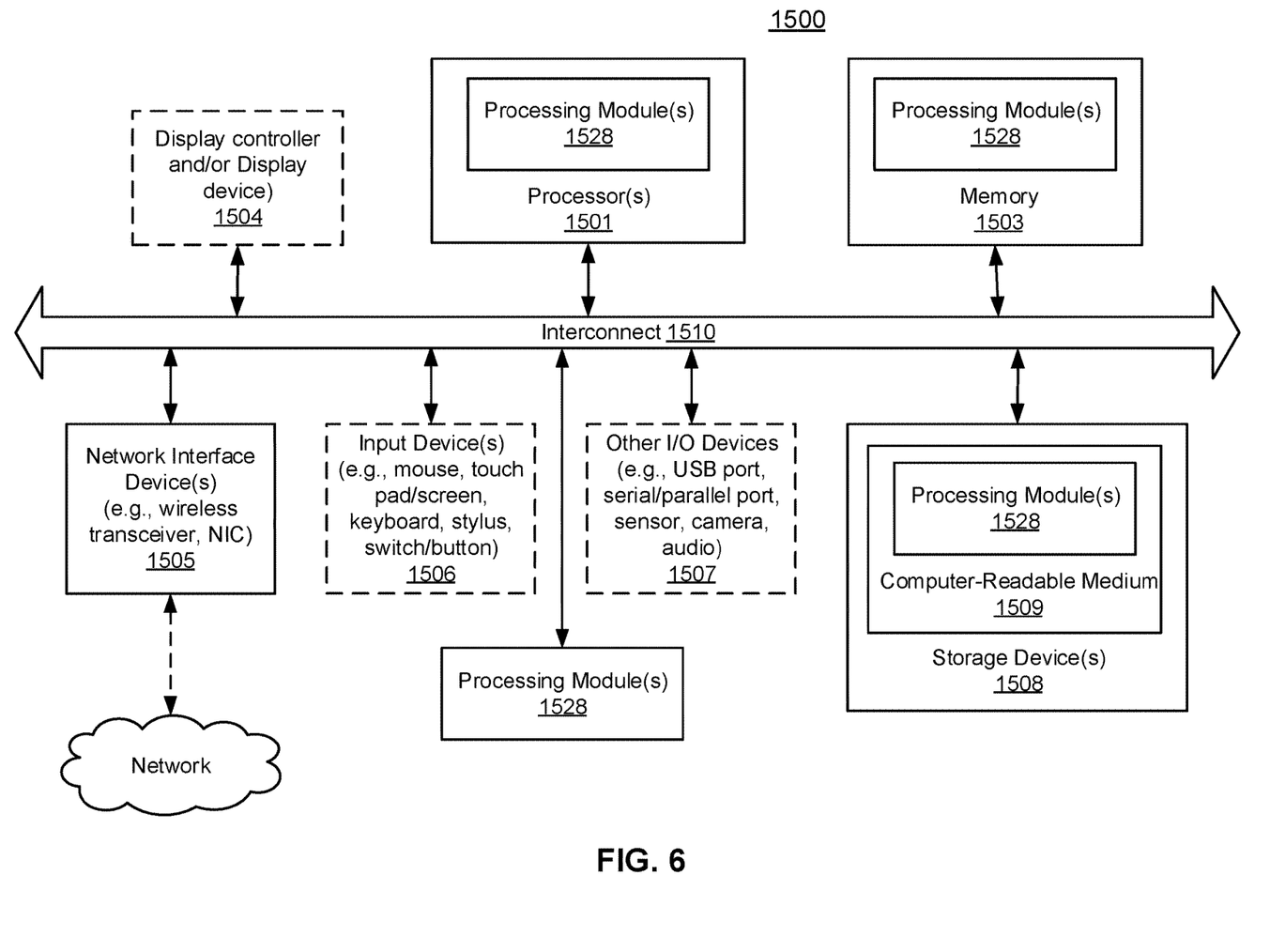
FIG. 6 is a block diagram illustrating a data processing system according to one embodiment.

FIG. 6 shows a block diagram illustrating an example of a data processing system which may be used with one embodiment of the invention. For example, system 1500 may represent any of data processing systems such as host 110, backup manager server 104, backup storage device 102, user machine 101, and indexing machine 130, for performing any of the processes or methods described in the present disclosure. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor

1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, proxy virtual machine 114, indexing manager 119, backup policy manager 106, indexing processor 132, search module 136, and hypervisor 112, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for indexing backup storage of virtual machines for searching, comprising:
   generating file metadata of a virtual machine when performing a backup of the virtual machine;
   storing a backup copy of the virtual machine and the file metadata of the virtual machine on a storage system; and
   retrieving, by an indexing machine, the file metadata from the storage system at intervals thereby synchronizing the file metadata with the backup copy, wherein the retrieving is independent of and decoupled from the performing of the backup of the virtual machine, the file metadata to be used for searching for files within the backup of the virtual machine.

2. The method according to claim 1, wherein generating the file metadata of the virtual machine includes extracting the file metadata from a file table of the virtual machine, the file metadata including a filename and an indication of a file path for each file in the virtual machine.

3. The method according to claim 2, wherein the indication of the file path includes a parent node identifier and a self-node identifier, the parent node identifier being a node identifier for a parent directory of a file, and the self-node identifier being an identifier for the file or sub-directory, and a full file path is not generated in the file metadata.

4. The method according to claim 3, further comprising reconstructing full file paths of files in the virtual machine, after retrieving the file metadata, based on the self-node identifier and the parent node identifier in the retrieved file metadata.

5. The method according to claim 1, wherein the file metadata is generated in a form of a file database, the file database containing a record for each file in the backup of the virtual machine, and each record of the file database has a fixed size, such that a size of the file database can be estimated based on a number of records in the file database.

6. The method according to claim 5, wherein the backup of the virtual machine is one of a plurality of backups for a plurality of virtual machines and each backup has a corresponding file database generated for it.

7. The method according to claim 1, wherein generating the file metadata is performed without deploying an agent or module on the virtual machine to communicate file data to be used for searching.

8. The method according to claim 1, wherein the method does not include downloading the backup copy from the storage system to be scanned for generating the file metadata.

9. The method according to claim 1, wherein the generating of the file metadata is performed by a host machine that manages and stores the virtual machine.

10. The method according to claim 9, wherein the retrieving of the file metadata is performed by an indexing machine.

11. The method according to claim 1, further comprising formatting the retrieved file metadata, the formatting being optimized for string-based searching.

12. A non-transitory machine-readable medium having instructions stored therein, which when executed by a processor, cause the processor to perform operations, the operations comprising:
 generating file metadata of a virtual machine when performing a backup of the virtual machine;
 storing a backup copy of the virtual machine and the file metadata of the virtual machine on a storage system; and
 retrieving, by an indexing machine, the file metadata from the storage system at intervals thereby synchronizing the file metadata with the backup copy, wherein the retrieving is independent of and decoupled from the performing of the backup of the virtual machine, the file metadata to be used for searching for files within the backup of the virtual machine.

13. The non-transitory machine-readable medium according to claim 12, wherein generating the file metadata of the virtual machine includes extracting the file metadata from a file table of the virtual machine, the file metadata including a filename and an indication of a file path for each file in the virtual machine.

14. The non-transitory machine-readable medium according to claim 13, wherein the indication of the file path is a parent node identifier and a self-node identifier, the parent node identifier being a node identifier for a parent directory of a file, and the self-node identifier being an identifier for the file or sub-directory, and a full file path is not generated in the file metadata.

15. The non-transitory machine-readable medium according to claim 14, further comprising reconstructing full file paths of files in the virtual machine based on the parent node identifier and the self-node identifier in the retrieved file metadata.

16. The non-transitory machine-readable medium according to claim 12, wherein the file metadata is generated in a form of a file database, the file database containing a record for each file in the backup virtual machine, and each record of the file database is a fixed size, such that a file database size can be estimated based on a number of records.

17. The non-transitory machine-readable medium according to claim 16, wherein the backup of the virtual machine is one of a plurality of backups for a plurality of virtual machines and each backup has a corresponding file database generated for it.

18. The non-transitory machine-readable medium according to claim 17, further comprising
 formatting the retrieved file metadata, the formatting being optimized for string-based searching; and
 entering the formatted file metadata into an indexed file metadata database, to be used for providing search results to a user based on a user query.

19. A system comprising:
 a host processing system that hosts one or more virtual machines having at least one hardware processor, the host processing system coupled to a memory programmed with executable instructions that, when executed by the host processing system, perform operations comprising:
  generating file metadata of a virtual machine when performing a backup of the virtual machine;
  storing a backup copy of the virtual machine and the file metadata of the virtual machine on a storage system; or
 an indexing processing system having at least one hardware processor, the indexing processing system coupled to a memory programmed with executable instructions that, when executed by the indexing processing system, perform operations comprising:
  retrieving by an indexing machine, the file metadata from the storage system at intervals thereby synchronizing the file metadata with the backup copy, wherein the retrieving is decoupled from the performing of the backup copy of the virtual machine, and the backup copy of the virtual machine is one of a plurality of backups for a plurality of virtual machines and each backup has a corresponding file database generated for it;
  formatting the retrieved file metadata; and
  indexing the formatted file metadata within an indexed file metadata database also containing formatted file metadata from the plurality of backups, to be used for providing search results to a user based on a user query.

* * * * *